United States Patent
Younis

(10) Patent No.: US 7,835,526 B2
(45) Date of Patent: Nov. 16, 2010

(54) METHOD AND SYSTEM FOR RESTRICTING MOBILITY USING UNIQUE ENCRYPTED CHARGERS

(75) Inventor: Saed G. Younis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 543 days.

(21) Appl. No.: 11/508,395

(22) Filed: Aug. 22, 2006

(65) Prior Publication Data

US 2006/0280306 A1    Dec. 14, 2006

Related U.S. Application Data

(63) Continuation of application No. 09/933,995, filed on Aug. 21, 2001, now abandoned.

(51) Int. Cl.
*H04K 1/00* (2006.01)
*H04L 9/32* (2006.01)
(52) U.S. Cl. .................................. 380/270; 713/169
(58) Field of Classification Search ........... 380/270; 713/169
See application file for complete search history.

(56) References Cited

U.S. PATENT DOCUMENTS

| | | | | |
|---|---|---|---|---|
| 5,282,250 A * | 1/1994 | Dent et al. | .................. | 380/247 |
| 5,473,689 A * | 12/1995 | Eberhard | .................... | 713/169 |
| 5,598,459 A * | 1/1997 | Haartsen | .................... | 455/411 |
| 5,784,464 A * | 7/1998 | Akiyama et al. | ............ | 713/155 |
| 5,952,814 A | 9/1999 | Van Lerberghe | | |
| 5,991,617 A * | 11/1999 | Powell | ..................... | 455/410 |
| 6,122,631 A * | 9/2000 | Berbec et al. | ................. | 707/9 |
| 6,144,840 A | 11/2000 | Alton et al. | | |
| 6,198,823 B1 * | 3/2001 | Mills | ......................... | 380/247 |
| 6,285,871 B1 * | 9/2001 | Daniels | ..................... | 455/411 |
| 6,323,775 B1 * | 11/2001 | Hansson | ................. | 340/636.1 |
| 6,377,792 B1 * | 4/2002 | Brown et al. | ............... | 455/411 |
| 6,427,073 B1 * | 7/2002 | Kortesalmi et al. | ...... | 455/414.1 |
| 6,429,622 B1 * | 8/2002 | Svensson | .................... | 320/106 |
| 6,580,929 B1 * | 6/2003 | Chiu | ......................... | 455/573 |
| 6,594,762 B1 * | 7/2003 | Doub et al. | .................. | 726/35 |
| 6,668,329 B1 | 12/2003 | Rudd et al. | | |

(Continued)

FOREIGN PATENT DOCUMENTS

DE        3803357 A1 *    8/1989

(Continued)

OTHER PUBLICATIONS

Moshopoulos, Nikos et al. "A Survey of Cryptography Algorithms—Trends and Products" National Technical University of Athens, 2000, pp. 1-28.*

(Continued)

*Primary Examiner*—Michael Pyzocha
(74) *Attorney, Agent, or Firm*—Won Tae C. Kim

(57) ABSTRACT

A method and system for disabling a mobile unit to handle a call processing function, after being away from its charging unit longer than a predetermined time period, allows a service provider to limit the mobility of the mobile unit with respect to its companion charging unit. Consequently, the service provider may limit the mobility of the mobile unit in a limited area, such as in a wireless local loop.

26 Claims, 10 Drawing Sheets

U.S. PATENT DOCUMENTS

| | | | |
|---|---|---|---|
| 6,775,563 B2 | 8/2004 | Younis | |
| 6,792,297 B2 * | 9/2004 | Cannon et al. | 455/573 |
| 6,804,517 B1 | 10/2004 | Laurila | |
| 6,907,254 B1 * | 6/2005 | Westfield | 455/456.4 |
| 7,000,115 B2 * | 2/2006 | Lewis et al. | 713/176 |
| 2001/0044295 A1 * | 11/2001 | Saito et al. | 455/410 |
| 2002/0094849 A1 * | 7/2002 | Cannon et al. | 455/573 |
| 2002/0164979 A1 * | 11/2002 | Mooney et al. | 455/417 |

FOREIGN PATENT DOCUMENTS

| | | | |
|---|---|---|---|
| GB | 2320397 A * | 6/1998 | |
| WO | 9828929 | 7/1998 | |
| WO | 9953621 | 10/1999 | |

OTHER PUBLICATIONS

Menezes, Alfred et al., "Handbook of Applied Cryptography," CRC Press 1997, p. 401.*

Vucetic, et al., "Network Management Applications for Wireless Local Loop," mediterranean Electro Technical Conference USA, IEEE (1998).

International Search Report—PCT/US02/025447, International Search Authority—European Patent Office, Apr. 4, 2003.

International Preliminary Report on Patentability—PCT/US02/026447, IPEA—US, Jun. 21, 2005.

* cited by examiner

METHOD AND SYSTEM FOR RESTRICTING MOBILITY USING UNIQUE ENCRYPTED CHARGERS

CLAIM OF PRIORITY UNDER 35 U.S.C. §120

The present Application for Patent is a Continuation of patent application Ser. No. 09/933,995 entitled "Method and System for Restricting Mobility Using Unique Encrypted Chargers" filed Aug. 21, 2001, now abandoned, and assigned to the assignee hereof and hereby expressly incorporated by reference herein.

BACKGROUND

1. Field

The present disclosed embodiments relate generally to communications, and more specifically to a wireless local loop.

2. Background

A wireless service provider may operate in a geographical area under an exclusive agreement with a local regulator such that other local service providers should not provide similar mobile service to their customers. Under such arrangements, the local service providers need to restrict mobility of their wireless customers within a limited area. One such environment may be a wireless local loop (WLL).

To restrict mobility of a mobile, a service provider may limit the mobility of the mobile's charging unit by, for example, making the charging unit larger and heavier. However, this solution suffers from increased cost and inconvenience to the subscriber. In addition, the solution may not be effective to restrict the mobility of the mobile, if the subscriber may find another similar charging unit while away from his or her charging unit. The local operator may require the subscribers to use fixed wireless terminals (FWT) instead of regular mobiles, but FWTs are bulky and more expensive.

There is therefore a need for a method and system that restricts the mobility of mobile units in a WLL, in a simple and inexpensive way.

SUMMARY

Embodiments disclosed herein address the above stated need. In one aspect of the invention, a method and system for call processing in a communications system, including a mobile apparatus and a charging apparatus, allows call processing if the mobile apparatus receives a request for call processing within a predetermined time period.

In another aspect of the invention, a method and system for a charging apparatus provides for the charging apparatus to receive a random number from the mobile apparatus, and to encrypt the random number. The method and system further provides for the charging apparatus to send the encrypted random number to the mobile apparatus.

In yet another aspect of the invention, a method and system for enabling a mobile apparatus for call processing causes the mobile apparatus to encrypt a random number, to send the random number to a charging apparatus, to receive an encrypted random number from the charging apparatus, and to enable the mobile apparatus based on the comparison of the encrypted random number in the mobile apparatus and the encrypted random number received from the charging apparatus.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

A subscriber station, referred to herein as a mobile, may communicate with one or more modem pool transceivers (MPTs) referred to herein as base stations. A mobile transmits and receives data packets through one or more modem pool transceivers to a base station controller. Modem pool transceivers and modem pool controllers may be parts of a base station. A base station transports data packets between multiple mobiles. The mobile may be further connected to additional networks, such as a corporate Intranet or the Internet, and may transport data packets between each mobile and such outside networks. A mobile that has established an active traffic channel connection with one or more modem pool transceivers is called an active mobile, and is said to be in a traffic state. A mobile that is in the process of establishing an active traffic channel connection with one or more modem pool transceivers is said to be in a connection setup state. A mobile may be any data device that communicates through a wireless channel. A mobile may further be any of a number of types of devices including but not limited to PC card, compact flash, external or internal modem, or wireless phone. The communication link through which the mobile sends signals to the modem pool transceiver is called a reverse link. The communication link through which a modem pool transceiver sends signals to an access terminal is called a forward link.

Figure 1:
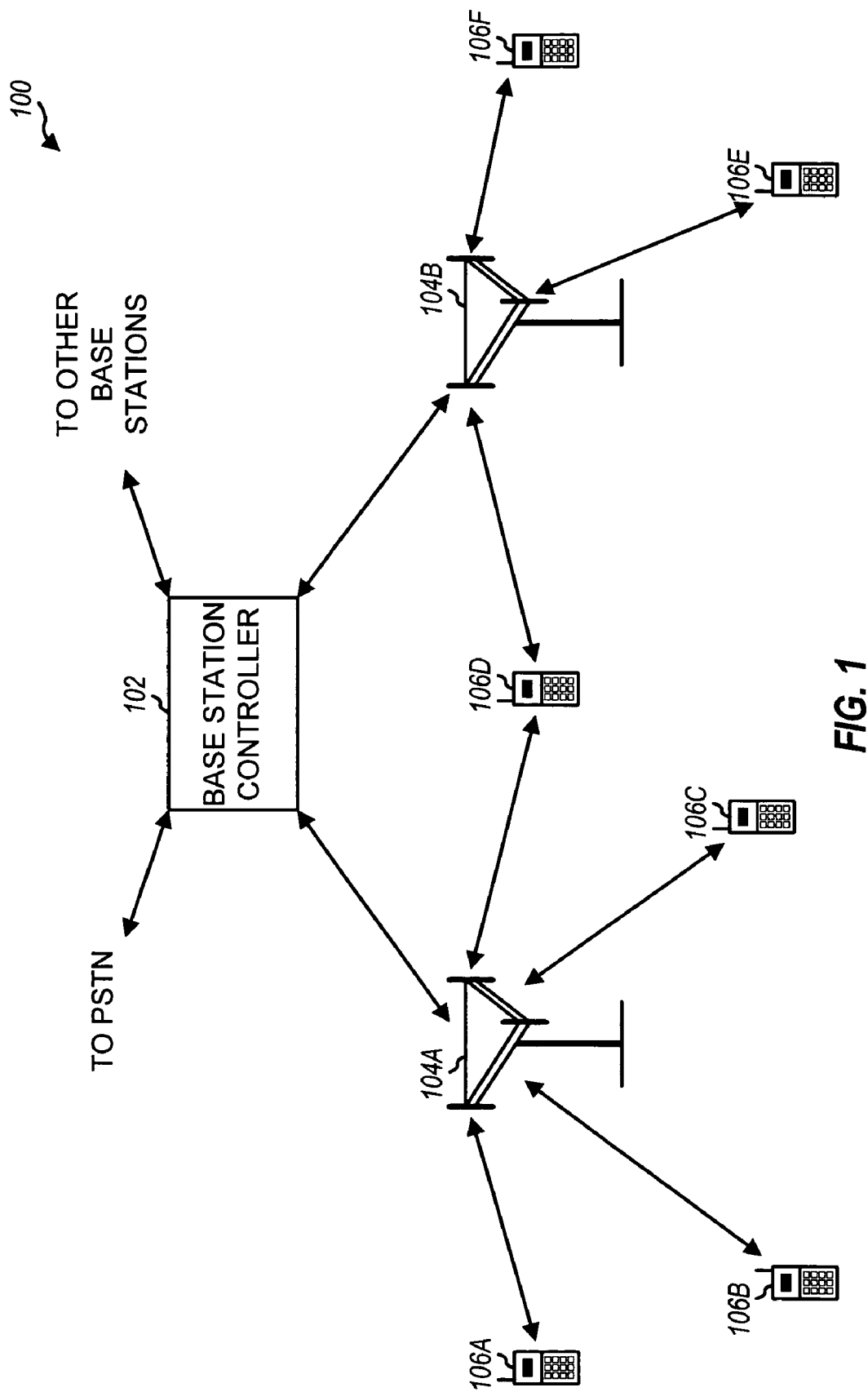
FIG. 1 is a diagram of a wireless communication system that supports a number of users.

FIG. 1 is a diagram of a wireless communication system 100 that supports a number of users and is capable of implementing various aspects of the invention. System 100 provides communication for a number of cells, with each cell being serviced by a corresponding base station 104. The base stations are also commonly referred to as base transceiver systems (BTSs). Various remote terminals 106 are dispersed throughout the system. Each remote terminal 106 may communicate with one or more base stations 104 on the forward and reverse links at any particular moment, depending on whether or not the remote terminal is active and whether or not it is in soft handoff. The forward link refers to transmission from base station 104 to remote terminal 106, and the reverse link refers to transmission from remote terminal 106 to base station 104. As shown in FIG. 1, base station 104a communicates with remote terminals 106a, 106b, 106c, and 106d, and base station 104b communicates with remote terminals 106d, 106e, and 106f. Remote terminal 106d is in soft handoff and concurrently communicates with base stations 104a and 104b.

In system 100, a base station controller (BSC) 102 couples to base stations 104 and may further couple to a public switched telephone network (PSTN). The coupling to the PSTN may be achieved via a mobile switching center (MSC), which is not shown in FIG. 1 for simplicity. A BSC may also couple into a packet network, which is typically achieved via a packet data serving node (PDSN) that is also not shown in FIG. 1. BSC 102 provides coordination and control for the base stations coupled to it. BSC 102 further controls the routing of telephone calls among remote terminals 106, and between remote terminals 106 and users coupled to the PSTN (e.g., conventional telephones) and to the packet network, via base stations 104.

System 100 may be designed to support one or more wireless standards. Such standards may include the CDMA standards such as (1) the "TIA/EIA-95-B Mobile Station-Base Station Compatibility Standard for Dual-Mode Wideband Spread Spectrum Cellular System" (the IS-95 standard); (2) the "TIA/EIA-98-D Recommended Minimum Standard for Dual-Mode Wideband Spread Spectrum Cellular Mobile Station" (the IS-98 standard); (3) the documents offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard); and (4) the documents offered by a consortium named "3rd Generation Partnership Project 2" (3GPP2) and embodied in a set of documents including Document Nos. C.S0002-A, C.S0005-A, C.S0010-A, C.S0011-A. C.S0024, and C.S0026 (the cdma2000 standard). In the case of the 3GPP and 3GPP2 documents, these are converted by standards bodies worldwide (e.g., TIA, ETSI, ARIB, TTA, and CWTS) into regional standards and have been converted into international standards by the International Telecommunications Union (ITU). These standards are incorporated herein by reference.

Figure 2:
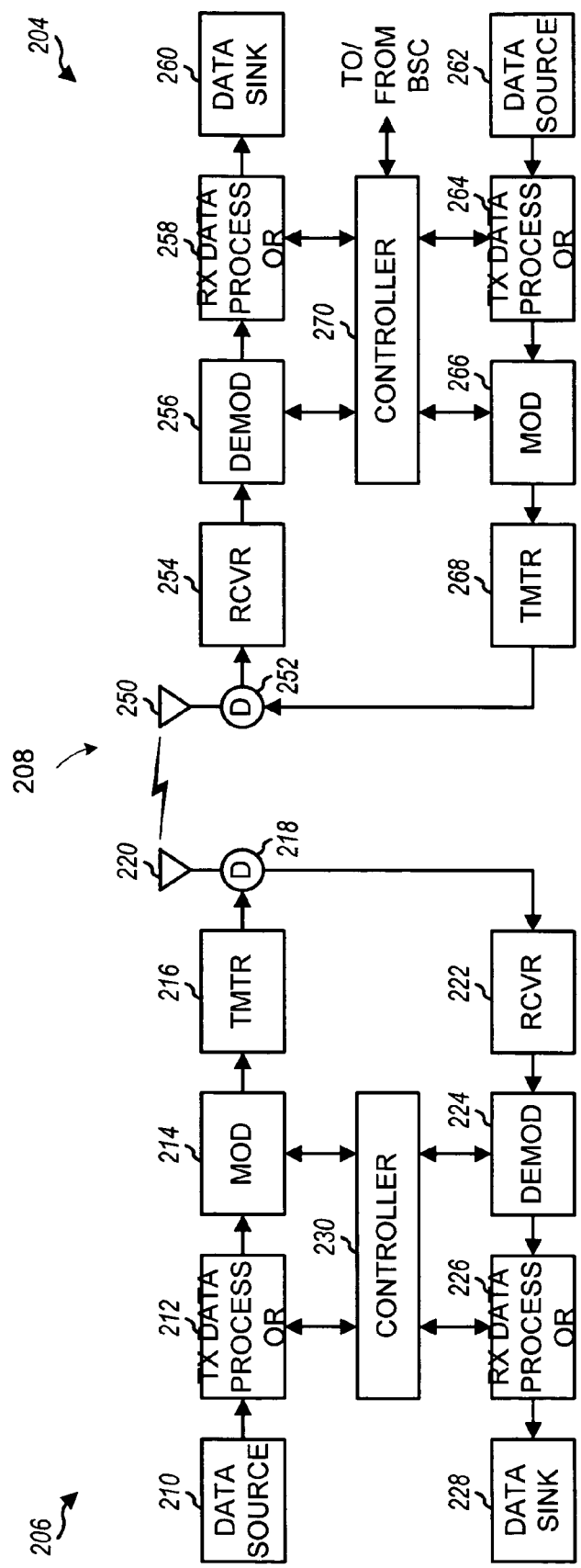
FIG. 2 is a simplified block diagram of an embodiment of a base station and a mobile station.

FIG. 2 is a simplified block diagram of an embodiment of base station 204 and remote terminal 206, which are capable of implementing various aspects of the invention. For a particular communication, voice data, packet data, and/or messages may be exchanged between base station 204 and remote terminal 206, via an air interface 208. Various types of messages may be transmitted, such as messages used to establish a communication session between the base station and remote terminal and messages used to control a data transmission (e.g., power control, data rate information, acknowledgment, and so on). Some of these message types are described in further detail below.

For the reverse link, at remote terminal 206, voice and/or packet data (e.g., from a data source 210) and messages (e.g., from a controller 230) are provided to a transmit (TX) data processor 212, which formats and encodes the data and messages with one or more coding schemes to generate coded data. Each coding scheme may include any combination of cyclic redundancy check (CRC), convolutional, turbo, block, and other coding, or no coding at all. The voice data, packet data, and messages may be coded using different schemes, and different types of messages may be coded differently.

The coded data is then provided to a modulator (MOD) 214 and further processed (e.g., covered, spread with short PN sequences, and scrambled with a long PN sequence assigned to the user terminal). The modulated data is then provided to a transmitter unit (TMTR) 216 and conditioned (e.g., converted to one or more analog signals, amplified, filtered, and quadrature modulated) to generate a reverse link signal. The reverse link signal is routed through a duplexer (D) 218 and transmitted via an antenna 220 to base station 204.

At base station 204, the reverse link signal is received by an antenna 250, routed through a duplexer 252, and provided to a receiver unit (RCVR) 254. Receiver unit 254 conditions (e.g., filters, amplifies, down converts, and digitizes) the received signal and provides samples. A demodulator (DEMOD) 256 receives and processes (e.g., despreads, decovers, and pilot demodulates) the samples to provide recovered symbols. Demodulator 256 may implement a rake receiver that processes multiple instances of the received signal and generates combined symbols. A receive (RX) data processor 258 then decodes the symbols to recover the data and messages transmitted on the reverse link. The recovered voice/packet data is provided to a data sink 260 and the recovered messages may be provided to a controller 270. The processing by demodulator 256 and RX data processor 258 are complementary to that performed at remote terminal 206. Demodulator 256 and RX data processor 258 may further be operated to process multiple transmissions received via multiple channels, e.g., a reverse fundamental channel (R-FCH) and a reverse supplemental channel (R-SCH). Also, transmissions may be simultaneously from multiple remote terminals, each of which may be transmitting on a reverse fundamental channel, a reverse supplemental channel, or both.

On the forward link, at base station 204, voice and/or packet data (e.g., from a data source 262) and messages (e.g., from controller 270) are processed (e.g., formatted and encoded) by a transmit (TX) data processor 264, further processed (e.g., covered and spread) by a modulator (MOD) 266, and conditioned (e.g., converted to analog signals, amplified, filtered, and quadrature modulated) by a transmitter unit (TMTR) 268 to generate a forward link signal. The forward link signal is routed through duplexer 252 and transmitted via antenna 250 to remote terminal 206.

At remote terminal 206, the forward link signal is received by antenna 220, routed through duplexer 218, and provided to a receiver unit 222. Receiver unit 222 conditions (e.g., down converts, filters, amplifies, quadrature modulates, and digitizes) the received signal and provides samples. The samples are processed (e.g., despreaded, decovered, and pilot demodulated) by a demodulator 224 to provide symbols, and the symbols are further processed (e.g., decoded and checked) by a receive data processor 226 to recover the data and messages transmitted on the forward link. The recovered data is provided to a data sink 228, and the recovered messages may be provided to controller 230.

Figure 3:
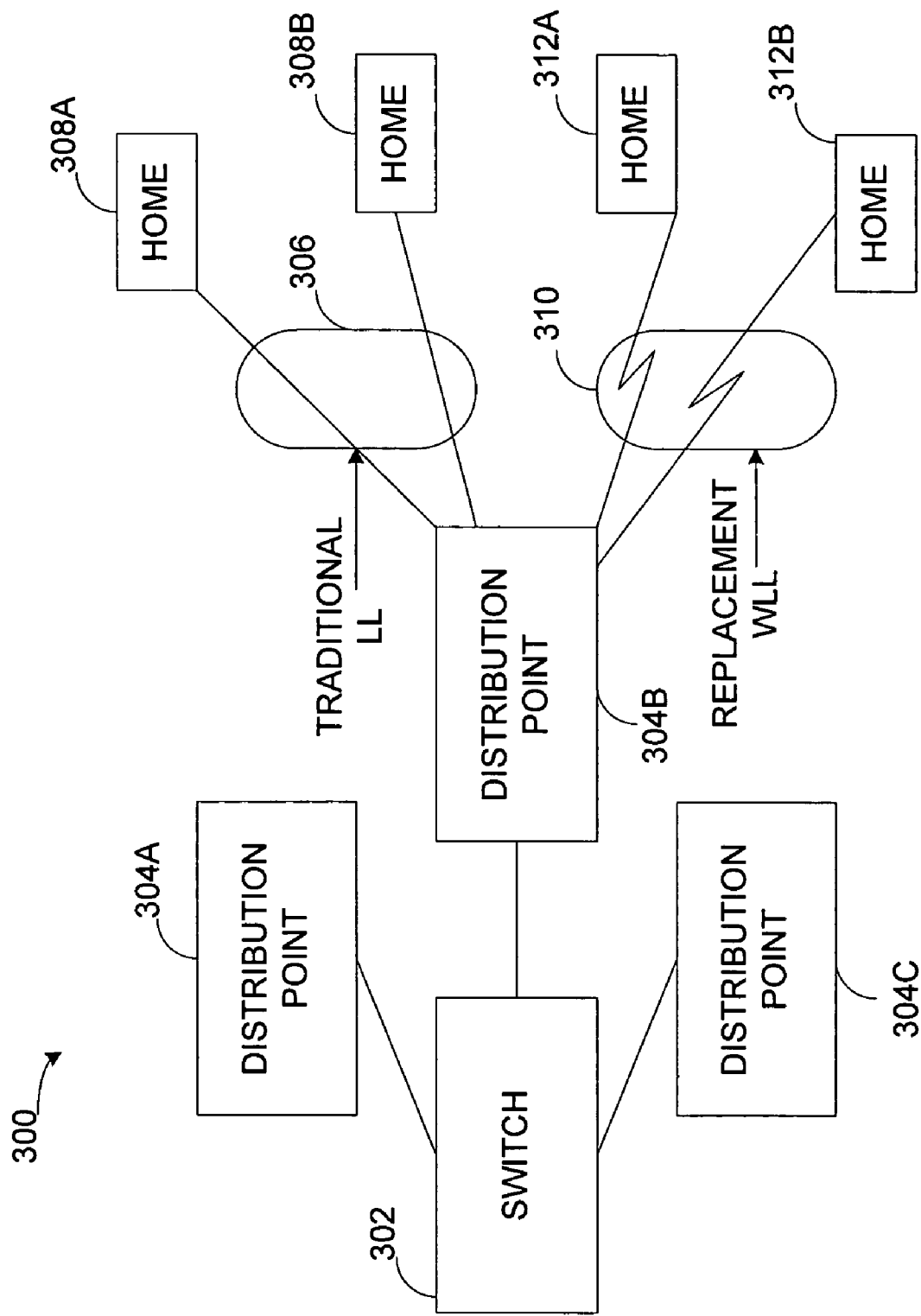
FIG. 3 is a representation of a wireless local loop.

A wireless communications system, as described in FIG. 2 for an exemplary embodiment of the invention, may be utilized in a wireless local loop (WLL) as shown in FIG. 3, for example. FIG. 3 shows a representation of a communications system infrastructure where a traditional wire local loop (LL) 306 may be replaced with a wireless local loop (WLL) 310. The traditional LL 306 connects subscribers 308A, 308B to the distribution point 304B through wire cables, whereas the WLL 310 connects subscribers 312A, 312B to the distribution point 304B through wireless communication. In one embodiment, the base station 204 (FIG. 2) may be positioned at a distribution point 304B, such that the mobile station 206 (FIG. 2) may provide wireless communication service to subscribers 312A and 312B in a limited range, such as a sector.

To restrict mobility for the mobiles operating in the WLL 310, according to one embodiment of the present invention, a WLL timer may be provided for each mobile such that the mobile may not be able to respond to a request for call processing if the request is received by the mobile after a predetermined time period. The WLL timer may be a software timer inside the mobile. The request for call processing may include a request to initiate a call or a request to receive an incoming call.

Figure 4:
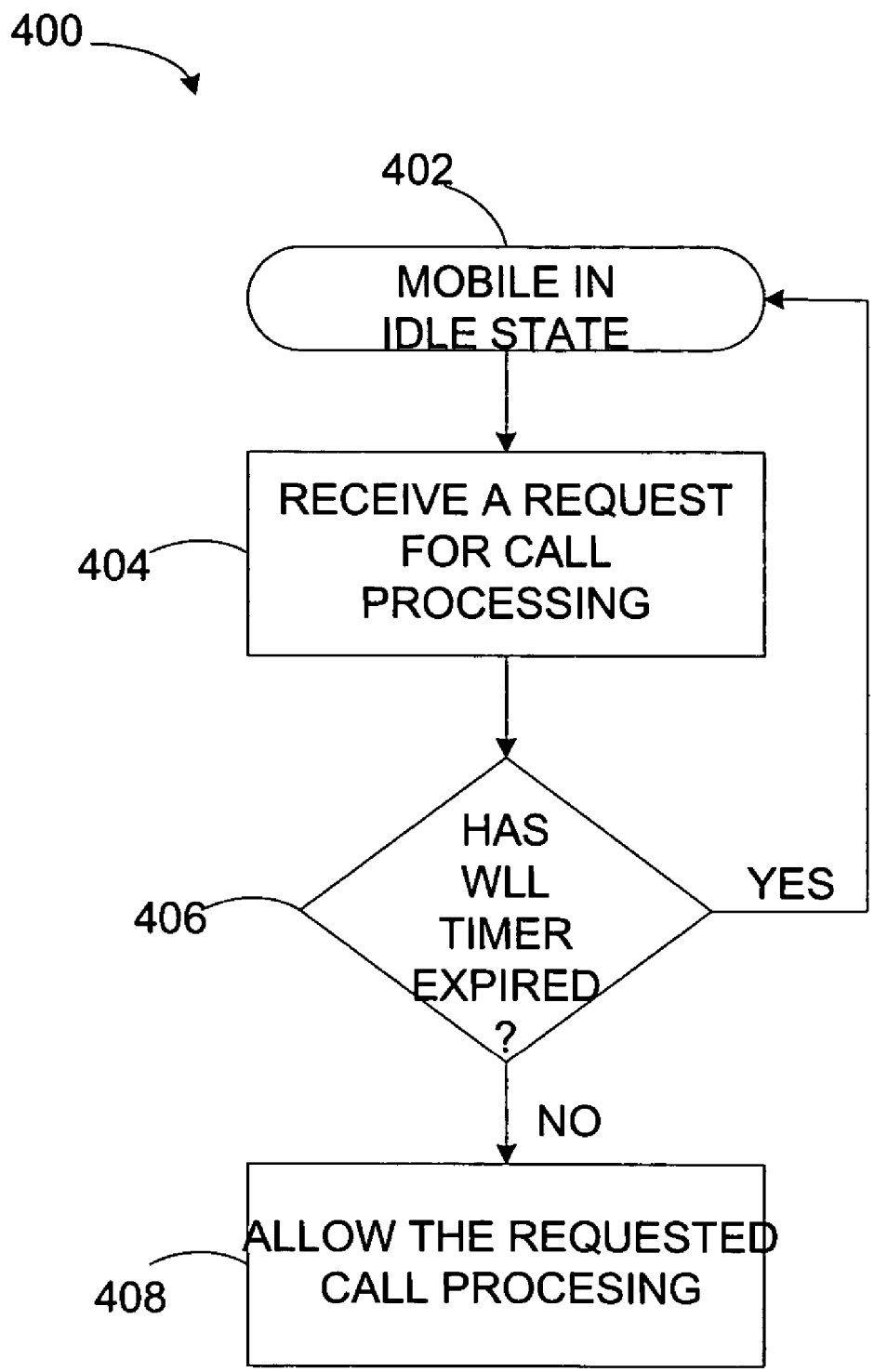
FIG. 4 is a flow chart for a mobile call processing in a wireless local loop.

FIG. 4 shows a flow chart 400 for restricting mobile call processing according to one embodiment. A mobile may be in an idle state 402, when it may receive a request for call processing, in step 404. In step 406, the mobile may check a WLL timer to determine if a predetermined time period has expired. In one embodiment, the timer may be implemented by using a register. The register may be loaded with the system time whenever the mobile is successfully enabled for call processing, as will be discussed below. When a call-processing request is received, the mobile may compare the content of the register with the current system time. If the difference is less than a predetermined time period, the timer has not expired and the call processing may be allowed. If the predetermined time period has expired, the mobile may be disabled to handle the requested call processing, and may return to idle state 402. If, however, the predetermined time period has not expired, the mobile may be enabled, in step 408, to handle the requested call processing.

Figure 5A:
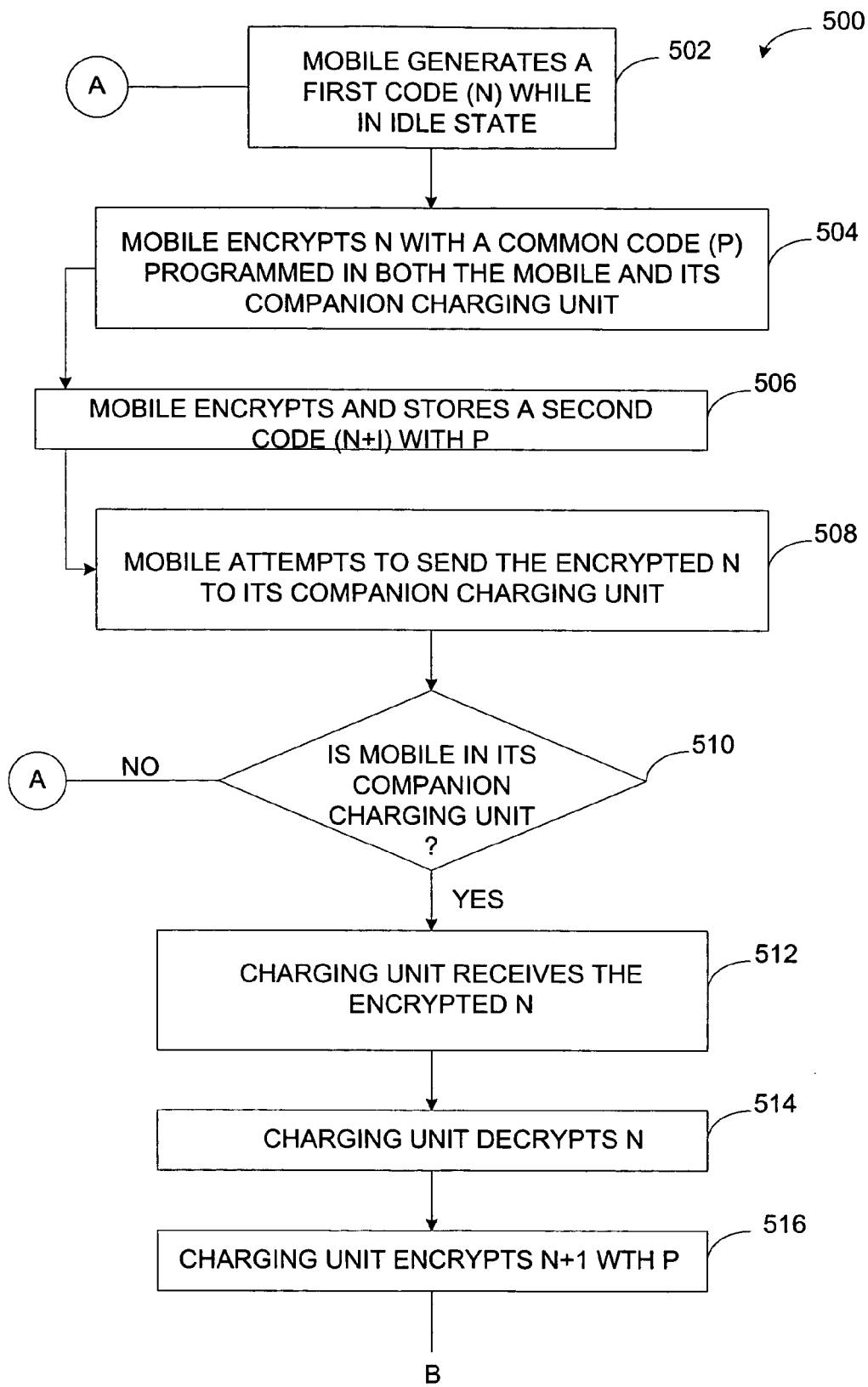
FIG. 5(A) and FIG. 5(B) are flow charts in accordance with one embodiment of the present invention.
Figure 5B:
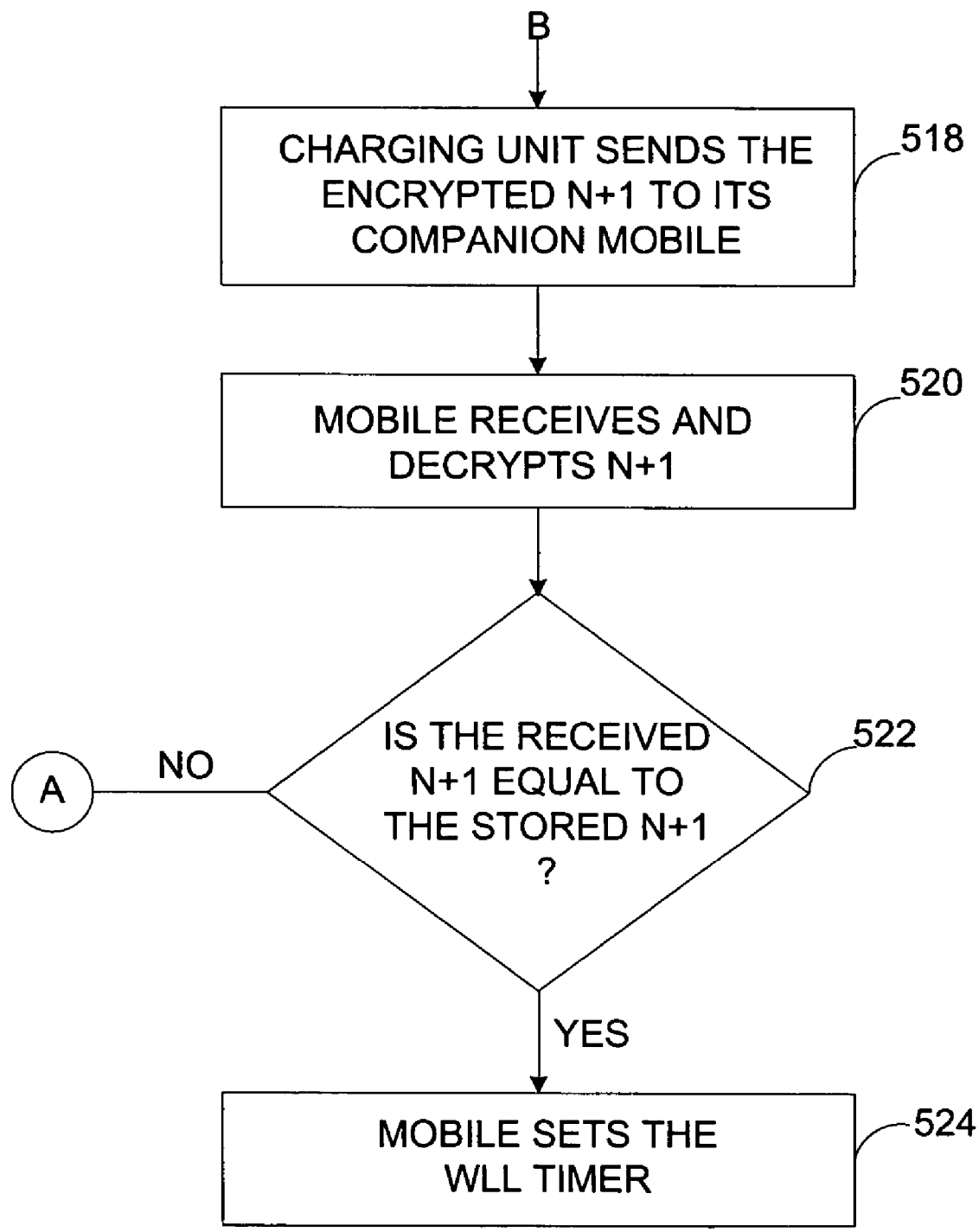

One embodiment for enabling a mobile for call processing will be described in reference to FIG. 5(A) and FIG. 5(B). A mobile may go through an enabling process while the mobile is in idle state. In one embodiment, the enabling process may be periodic. In the idle state, a mobile may periodically monitor a paging or control channel for overhead messages and parameters, which may also include control signals and data for enabling the mobile for call processing, according to one embodiment of the invention. In one embodiment, a mobile may go through the enabling process when the mobile is positioned on a dedicated charging unit that is dedicated to the mobile. A charging unit may include a microcontroller for implementing the mobile enabling process, devices for performing mobile charging, and input/output devices for communicating with the mobile. A mobile may also include necessary devices for information processing and input/output operations.

The mobile enabling process may be carried out through an encryption process between a mobile and a charging unit, as will be described below. The encryption process may be implemented by exchanging secure random codes between the mobile and the charging unit. After determining that the mobile is legitimately communicating with its dedicated charging unit, the mobile may be enabled for call processing for only a predetermined time period, or alternatively for a predetermined distance form the charging unit, which restricts the mobility of the mobile if taken away from its dedicated charging unit.

In step 502, a mobile may generate a first random number or code, N, based on some predetermined criteria. In step 504, the mobile may encrypt the first code N with a common code, P, which is commonly known by the mobile and its companion charging unit. The common code P may be programmed inside both the mobile and the dedicated charging unit, which may be dedicated to each other during the provisioning process by the service provider. The programming process may be carried out through the data ports provided for the mobile and its charging unit. The common code P may be programmed inside memory devices located inside the mobile and its dedicated charging unit. For security purposes, the programming of the code P may be restricted to only when the target memory devices are blank, such that such memory devices in the mobile and the charging unit are one-time programmable. Such memory devices may be flash memory devices. In another embodiment, the mobile may encrypt the first code N by using a private code and a public code, an encryption technique that is well known in the art.

In step 506, the mobile may also encrypt a predetermined variation of the first code N to generate a second code, e.g., N+1, using the same common code P. In step 508, the mobile attempts to send the encrypted first code N to its dedicated charging unit. In step 510, the mobile determines whether the mobile is positioned on its dedicated charging unit. If the mobile is positioned on its companion charging unit, the mobile sends, and the charging unit receives, the encrypted first code N, in step 512. If, however, the mobile is not positioned on its companion charging unit, the mobile may not be enabled for call processing, and may transition to idle state 502, where the mobile may wait for the next enabling cycle.

In step 514, the charging unit, having received an encrypted first code N from its companion mobile and knowing the common code P, decrypts the first code N. Similar to step 506, the charging unit, in step 516, generates the same predetermined variation of the first code N to generate a second code, e.g., N+1, using the same common code P. In step 518, the charging unit sends the encrypted second code, N+1, to its companion mobile. In step 520, the mobile receives and decrypts, using the common code P, the output information it has received from its companion charging unit. In step 522, the mobile compares the decrypted output signal received from its dedicated charging unit with the stored second code N+1 that the mobile had generated in step 506, as discussed above. If these two codes match, it is verified that the mobile is actually positioned on its dedicated charging unit, and thus the mobile is enabled for call processing. In one embodiment, the mobile may be enabled for a predetermined period of time, for example by resetting a WLL timer in the mobile to a predetermined value, in step 526. Alternatively, a down counter may be used. If, however, the result of the comparison in step 5224 is negative, which indicates that the mobile may not be positioned on its companion charging unit, the mobile is not enabled and may transition to the idle state 502, where the mobile may wait for the next enabling cycle.

Figure 6A:
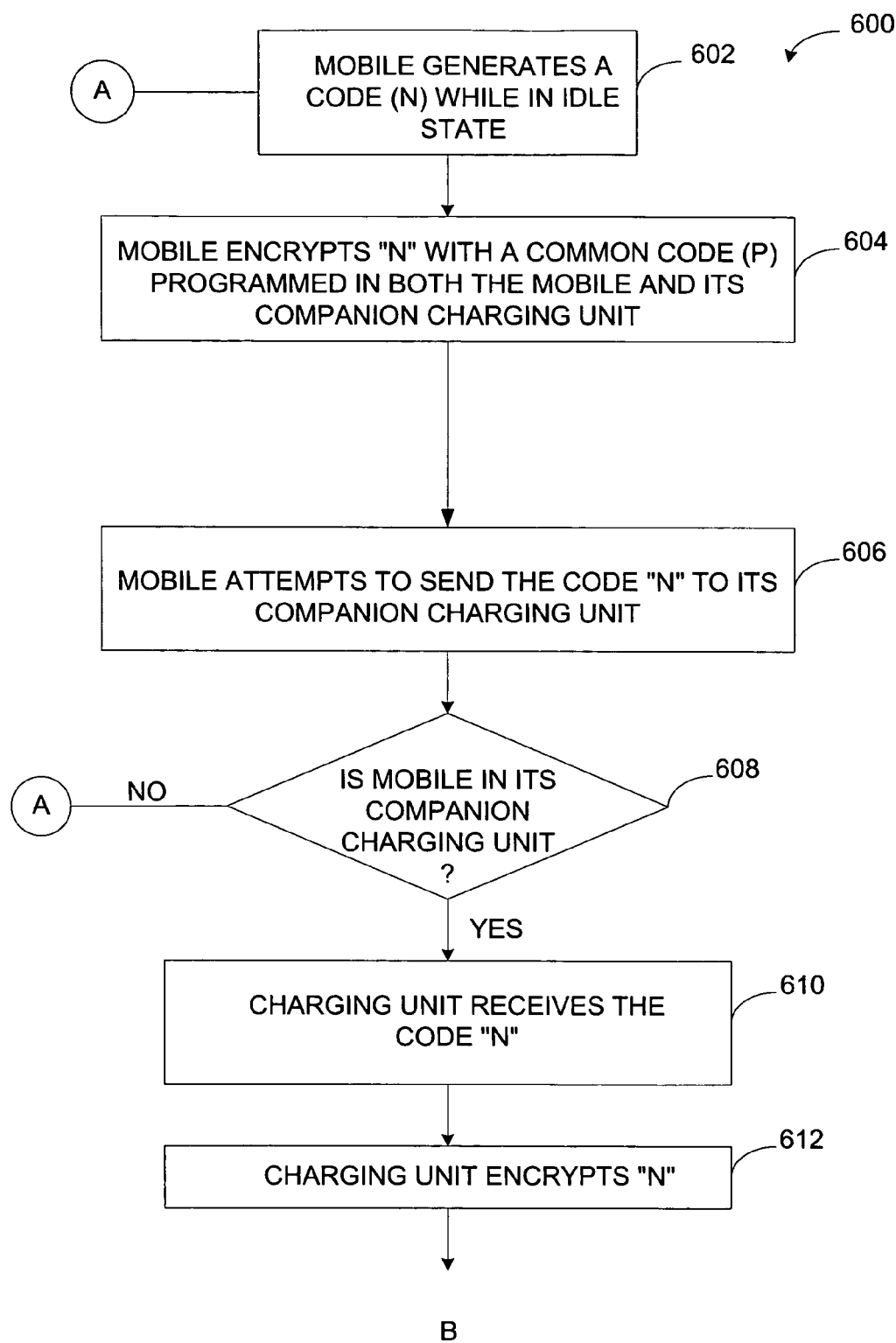
FIG. 6A and FIG. 6B are flow charts in accordance with another embodiment of the present invention.
Figure 6B:
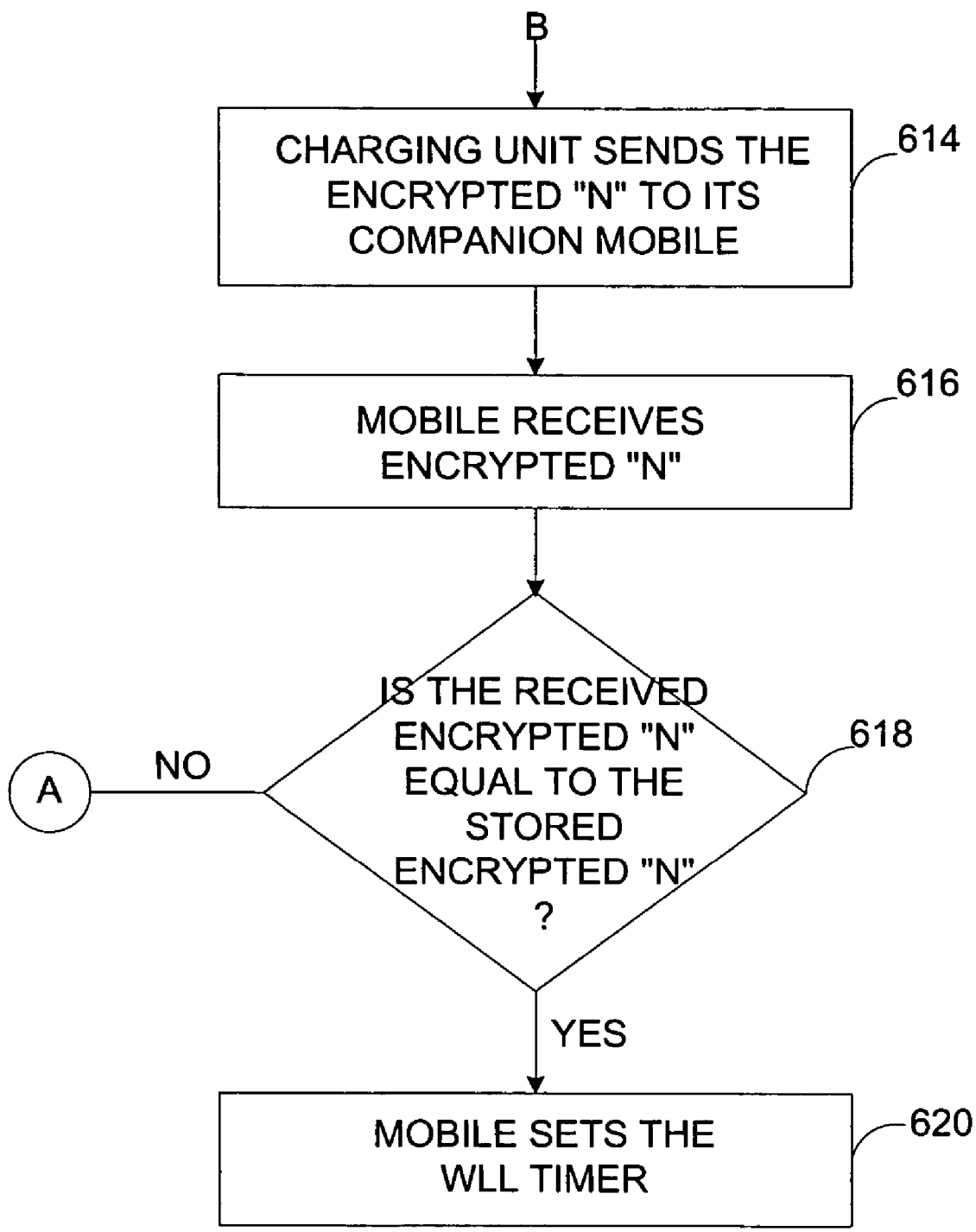

Another embodiment for enabling a mobile for call processing will be described in reference to FIG. 6A and FIG. 6B. In step 602, a mobile may generate a random number or code (N) based on some predetermined criteria. In one embodiment, the random number may be generated by encrypting the system time. The encryption may be based on the Rijndael 128-bit key encryption technique, for example. In step 604, the mobile may encrypt the code N with a common code, P, which is commonly known by the mobile and its companion charging unit, as explained above in connection with FIG. 5A. The encryption may be based on the Rijndael 128-bit key encryption technique, for example.

In step 606, the mobile attempts to send the code N to its dedicated charging unit. In step 608, the mobile determines whether the mobile is positioned on its dedicated charging unit. If the mobile is positioned on its companion charging unit, the mobile sends, and the charging unit receives, the code N, in step 610. In one embodiment, the mobile may determine the presence of its companion charging unit by sensing an active voltage on the mobile's receiving line. If, however, the mobile is not positioned on its companion charging unit, the mobile may not be enabled for call processing, and may transition to idle state 602, where the mobile may wait for the next enabling cycle.

In step 612, the charging unit, having received the code N from its companion mobile and knowing the common code P, encrypts the code N using the common code P. The encryption may be based on the Rijndael 128-bit key encryption technique, for example. In step 614, the charging unit sends the encrypted code to its companion mobile. In step 616, the mobile receives the encrypted code N. In step 618, the mobile compares the encrypted code N received from its dedicated charging unit with the stored encrypted code N. If these two codes match, it is verified that the mobile is actually positioned on its dedicated charging unit, and thus the mobile is enabled for call processing. In one embodiment, the mobile may be enabled for a predetermined period of time, for example by resetting a WLL timer in the mobile to a predetermined value, in step 620. Alternatively, a down counter may be used. If, however, the result of the comparison in step 618 is negative, which indicates that the mobile may not be positioned on its companion charging unit, the mobile is not enabled and may transition to the idle state 602, where the mobile may wait for the next enabling cycle.

Figure 7A:
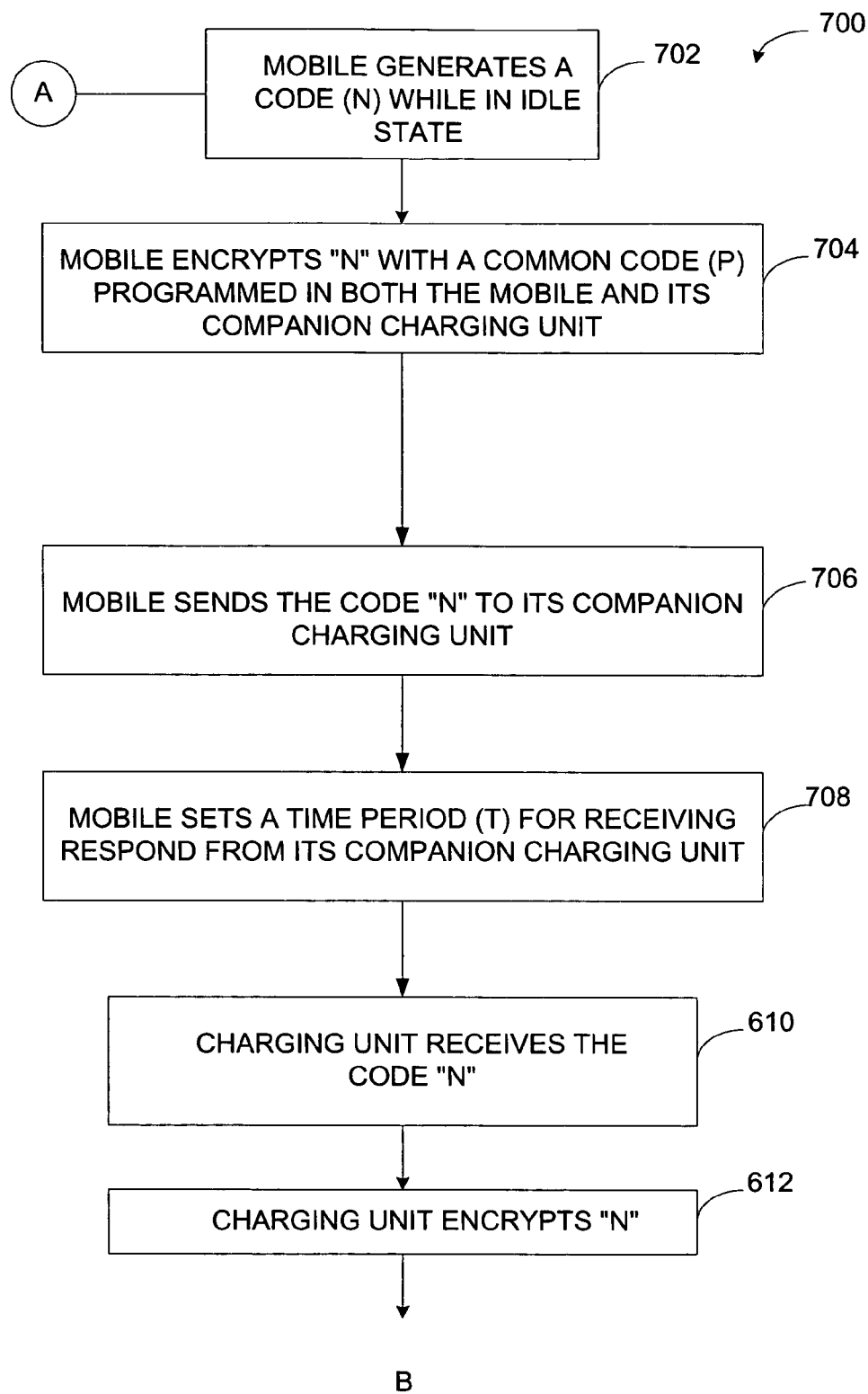
FIG. 7A and FIG. 7B are flow charts in accordance with another embodiment of the present invention.
Figure 7B:
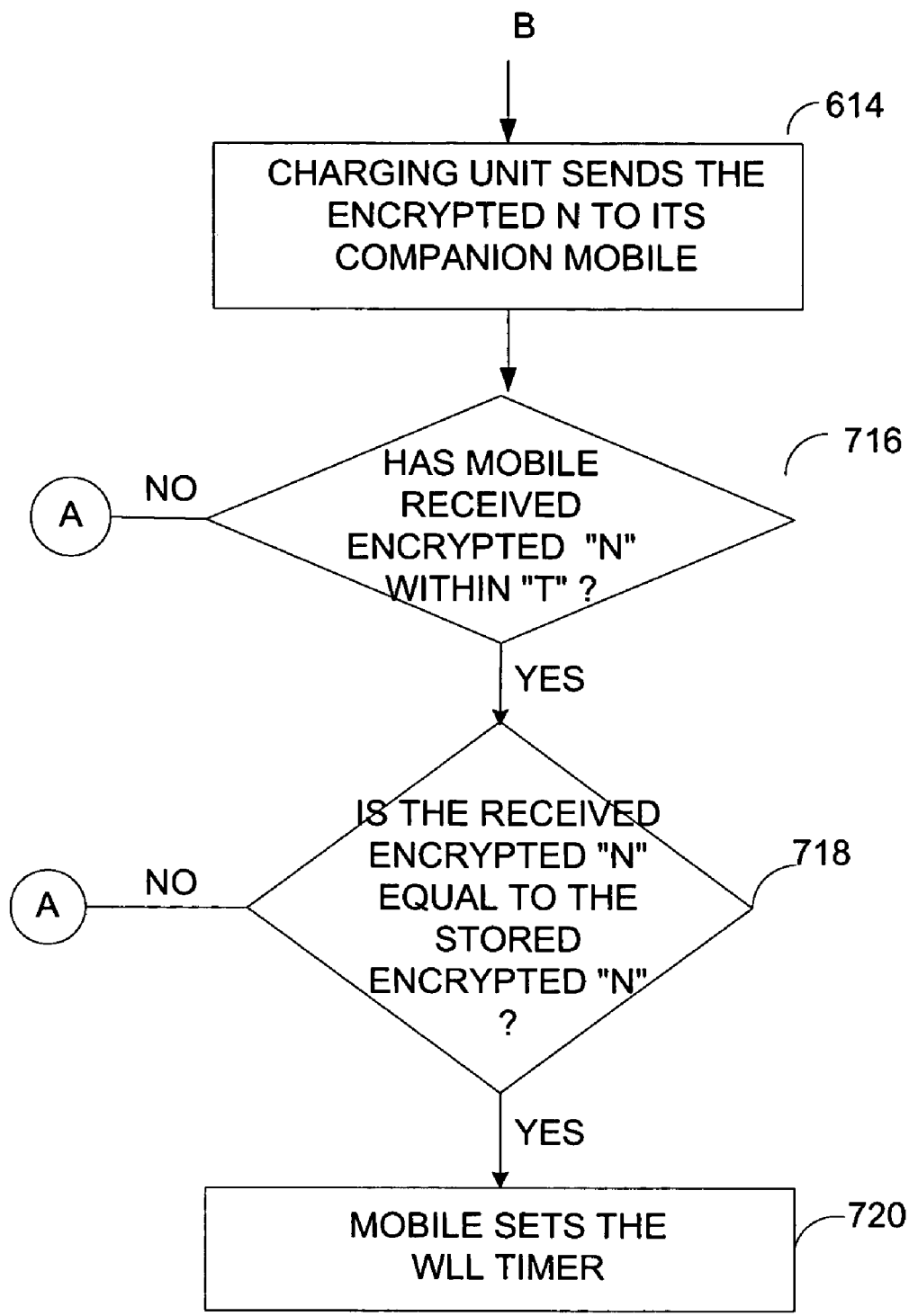

An alternative embodiment will be described in reference to FIG. 7A and FIG. 7B. FIG. 7A differs from FIG. 6A in that, after the mobile sends the code N to its companion charging unit in step 706, the mobile sets a time period (T), in step 708, for receiving a respond from its companion charging unit. FIG. 7B differs from FIG. 6B in that the mobile may check, in step 716, whether it has received a respond from a charging unit within the time period (T). If the mobile did not receive a respond from a charging unit within the time period (T), the mobile may assume that it is not connected to any charging unit.

According to one embodiment of the invention, the mobile may be enabled for call processing if the mobile is located within a predetermined distance from its dedicated charging unit. In this embodiment, the mobile may communicate to its dedicated charging unit through limited-range wireless communications means, which allows an encryption method, such as one described above, to be performed while the mobile is not necessarily positioned on its dedicated charging unit. One such limited wireless communications device may be Bluetooth™ wireless technology, for example.

By disabling the mobile to handle a call processing function after being away from its dedicated charging station for a predetermined time period, the service provider may limit the mobility of its mobiles with respect to their companion charging units. The service provider may also limit the mobility of the charging units by, for example, making them larger and heavier. Consequently, the service provider may limit the mobility of the mobiles in a limited area, such as in a wireless local loop.

Advantageously, no hardware modifications are required for a mobile to operate in a WLL, as described above. In addition, after a "mobile license" is granted to a subscriber, the mobile may be easily reprogrammed to lift its programmed mobility restriction.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a mobile. In the alternative, the processor and the storage medium may reside as discrete components in a mobile unit. The word "exemplary" is used exclusively herein to mean "serving as an example, instance, or illustration." Any embodiment described herein as "exemplary" is not necessarily to be construed as preferred or advantageous over other embodiments.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for restricting mobility of a mobile apparatus for call processing within a wireless local loop, the method comprising:
   encrypting a random number at the mobile apparatus;
   establishing a first connection with a charging apparatus;
   sending the random number from the mobile apparatus to the charging apparatus over the first connection;
   encrypting the random number at the charging apparatus;
   receiving at the mobile apparatus the encrypted random number from the charging apparatus over the first connection; and
   restricting mobility of the mobile apparatus by enabling the mobile apparatus to establish a second connection for call processing within the wireless local loop based on a successful comparison of the encrypted random number at the mobile apparatus with the encrypted random number received from the charging apparatus, and disabling the mobile apparatus from establishing the second connection for call processing within or outside the wireless local loop if the comparison is unsuccessful.

2. The method of claim 1, wherein the random number is an encrypted system time.

3. The method of claim 1, wherein the first connection is separate and distinct from the second connection.

4. The method of claim 1, wherein the encrypting includes encrypting the random number based on Rijndael 128-bit key encryption technique.

5. The method of claim 1, wherein the enabling further includes enabling the mobile apparatus for a predetermined period of time.

6. The method of claim 1, wherein the enabling further includes enabling the mobile apparatus while the mobile apparatus is positioned on the charging apparatus that is dedicated to the mobile apparatus.

7. The method of claim 1, wherein the enabling further includes enabling the mobile apparatus while the mobile apparatus is located within a predetermined distance from the charging apparatus that is dedicated to the mobile apparatus.

8. The method of claim 1, wherein the enabling further includes enabling the mobile apparatus from a predetermined distance from the charging apparatus that is dedicated to the mobile apparatus.

9. The method of claim 1, wherein the charging apparatus also restricts operation of the mobile apparatus by an algorithm used to encrypt the random number at the charging apparatus.

10. The method of claim 1, wherein the charging apparatus is uniquely associated with the mobile apparatus so that both the charging apparatus and mobile apparatus use the same encryption algorithm to encrypt the random number.

11. The method of claim 1, wherein if the encrypted random number at the mobile apparatus is the same as the encrypted random number received from the charging apparatus, the mobile apparatus can establish wireless communications.

12. The method of claim 1, wherein if the encrypted random number at the mobile apparatus is not the same as the encrypted random number received from the charging apparatus, the mobile apparatus is prevented from establishing wireless communications.

13. The method of claim 1, wherein the mobility of the mobile apparatus is restricted relative to the charging apparatus even when the mobile apparatus is already charged.

14. The method of claim 1, wherein the mobility of the mobile apparatus is restricted relative to the charging apparatus irrespective of user interaction.

15. The method of claim 1, wherein the mobile apparatus wirelessly sends the random number to the charging apparatus while it is at a distance from the charging apparatus.

16. The method of claim 1, further comprising:
initiating a timeout timer after enabling the mobile apparatus based on a successful comparison of the encrypted random number at the mobile apparatus with the encrypted random number received from the charging apparatus, wherein upon expiration of the timeout timer the mobile apparatus is disabled.

17. The method of claim 1, wherein disabling the mobile apparatus includes preventing incoming and outgoing calls.

18. A mobile apparatus having restricted mobility for call processing within a wireless local loop comprising:

means for generating a random number;
means for establishing a first connection with a charging apparatus;
means for encrypting the random number;
means for sending the random number to the charging apparatus over the first connection;
means for receiving an encrypted version of the random number from the charging apparatus over the first connection; and
means for restricting mobility of the mobile apparatus by enabling the mobile apparatus to establish a second connection for call processing within the wireless local loop based on a successful comparison of the encrypted random number at the mobile apparatus with the encrypted version of the random number received from the charging apparatus, and disabling the mobile apparatus from establishing the second connection for call processing within or outside the wireless local loop if the comparison is unsuccessful.

19. A mobile apparatus having restricted mobility for call processing within a wireless local loop comprising:

a processor configured to generate a random number, the processor also configured to encrypt the random number;
memory configured to store the random number and the encrypted random number;
a transmitter configured to send the random number over a first connection to a charging unit; and
a receiver configured to receive an encrypted version of the random number over the first connection from the charging unit, wherein the processor is also configured to restrict mobility of the mobile apparatus by enabling the mobile apparatus to establish a second connection for call processing within the wireless local loop based on a successful comparison of the encrypted random number stored in the memory of the mobile apparatus unit and the encrypted random number received from the charging unit, and disable the mobile apparatus from establishing the second connection for call processing within or outside the wireless local loop if the comparison is unsuccessful.

20. A charging apparatus comprising:
means for receiving an encrypted first random number from a mobile apparatus over a first connection;
means for decrypting the received encrypted first random number from the mobile apparatus to reveal the first random number;
means for generating a second random number based on the first random number;
means for encrypting the second random number; and
means for sending the encrypted second random number over the first connection to the mobile apparatus, wherein mobility of the mobile apparatus is restricted for call processing over a second connection within a wireless local loop if a corresponding second random number stored within the mobile apparatus does not match the second random number sent by the charging apparatus.

21. The charging apparatus of claim 20, wherein the charging apparatus also restricts operation of the mobile apparatus by an algorithm used to encrypt the second random number at the charging apparatus.

22. The charging apparatus of claim 20, wherein the charging apparatus is uniquely associated with the mobile apparatus so that the mobile apparatus operates at only within a certain range from the charging apparatus.

23. A charging apparatus comprising:

a receiver configured to receive an encrypted first random number from a mobile apparatus over a first connection;

a processor configured to decrypt the received encrypted first random number from the mobile apparatus to reveal the first random number, the processor further configured to encrypt a second random number, wherein the second random number is generated based on the first random number; and a transmitter configured to send the encrypted second random number to the mobile apparatus over the first connection, wherein mobility of the mobile apparatus is restricted for call processing over a second connection within a wireless local loop if a corresponding second random number stored within the mobile apparatus does not match the second random number sent by the charging apparatus.

24. A non-transitory computer readable medium comprising instructions for restricting mobility of a mobile apparatus for call processing within a wireless local loop, the instructions when executed by a machine, cause the machine to perform operations comprising:

encrypting a random number at the mobile apparatus;

establishing a first connection with a charging apparatus;

sending the random number from the mobile apparatus to the charging apparatus over the first connection;

encrypting the random number at the charging apparatus;

receiving at the mobile apparatus the encrypted random number from the charging apparatus over the first connection; and restricting mobility of the mobile apparatus by enabling the mobile apparatus to establish a second connection for call processing within the wireless local loop based on a successful comparison of the encrypted random number at the mobile apparatus with the encrypted random number received from the charging apparatus, and disabling the mobile apparatus from establishing the second connection for call processing within or outside the wireless local loop if the comparison is unsuccessful.

25. A method for a charging apparatus to restrict mobility of a mobile apparatus comprising:

receiving at the charging apparatus an encrypted first random number from the mobile apparatus over a first connection;

decrypting the received encrypted first random number from the mobile apparatus to reveal the first random number;

generating a second random number based on the first random number;

encrypting the second random number; and sending the encrypted second random number over the first connection to the mobile apparatus, wherein mobility of the mobile apparatus is restricted for call processing over a second connection within a wireless local loop if a corresponding second random number stored within the mobile apparatus does not match the second random number sent by the charging apparatus.

26. A non-transitory computer readable medium comprising instructions for a charging apparatus to restrict mobility of a mobile apparatus for call processing within a wireless local loop, the instructions when executed by a machine, cause the machine to perform operations comprising:

receiving at the charging apparatus an encrypted first random number from the mobile apparatus over a first connection;

decrypting the received encrypted first random number from the mobile apparatus to reveal the first random number;

generating a second random number based on the first random number;

encrypting the second random number; and sending the encrypted second random number over the first connection to the mobile apparatus, wherein mobility of the mobile apparatus is restricted for call processing over a second connection within a wireless local loop if a corresponding second random number stored within the mobile apparatus does not match the second random number sent by the charging apparatus.

* * * * *